(12) United States Patent
Jensen (10) Patent No.: US 6,373,934 B2
(45) Date of Patent: *Apr. 16, 2002

(54) METHOD AND APPARATUS FOR PROVIDING CALL DETAIL RECORDS AT SUBSCRIBER PREMISES

(76) Inventor: David D. Jensen, P.O. Box 541126, Omaha, NE (US) 68154

(*) Notice: Subject to any disclaimer, the term of this patent is extended or adjusted under 35 U.S.C. 154(b) by 0 days.

This patent is subject to a terminal disclaimer.

(21) Appl. No.: 09/860,219

(22) Filed: May 19, 2001

Related U.S. Application Data (63) Continuation of application No. 09/092,704, filed on Jun. 5, 1998, now Pat. No. 6,240,164.

(51) Int. Cl.[7] .................. H04M 1/24; H04M 15/00; H04M 1/56

(52) U.S. Cl. ............. 379/140; 379/32.01; 379/133; 379/142.01; 379/142.17

(58) Field of Search ............ 379/32.01, 32.04, 379/112.01, 114.01, 114.03, 114.05, 114.17, 114.28, 117, 118, 119, 127.01, 130, 131, 133, 140, 141, 142.01

(56) References Cited

U.S. PATENT DOCUMENTS

| | | | | | |
|---|---|---|---|---|---|
| 4,277,648 A | * | 7/1981 | Glassman | ............... | 179/7.1 R |
| 4,656,657 A | * | 4/1987 | Hunsicker | ............... | 379/140 |
| 5,146,490 A | * | 9/1992 | Beckman | ............... | 379/113 |
| 5,255,183 A | * | 10/1993 | Katz | ............... | 364/406 |
| 5,615,252 A | * | 3/1997 | Sizer, II et al. | ............... | 379/142 |
| 5,692,037 A | * | 11/1997 | Friend | ............... | 379/114 |
| 5,734,706 A | * | 3/1998 | Windsor et al. | ............... | 379/142 |
| 5,742,699 A | * | 4/1998 | Lim | ............... | 379/130 |
| 5,748,718 A | * | 5/1998 | Manicone | ............... | 379/131 |
| 5,809,122 A | * | 9/1998 | Jang | ............... | 379/140 |
| 6,240,164 B1 | * | 5/2001 | Jensen | ............... | 379/142.01 |

* cited by examiner

Primary Examiner—Curtis Kuntz
Assistant Examiner—Quoc Tran

(57) ABSTRACT

An apparatus and method for automatically monitoring and recording incoming and outgoing telephone call parameters and forming a call record in response thereto. The apparatus has a signal conditioning device connected to the telephone line; incoming and outgoing call decoders; line status detector device; clock; and a computation device. The incoming call record comprises the incoming call data such as caller's identity and number, the call start and end times, and the call duration, the outgoing call record comprises the outgoing call data, the call start and end times, and the call duration. The records may be printed immediately as the call is concluded or stored an printed later by account number.

10 Claims, 10 Drawing Sheets

METHOD AND APPARATUS FOR PROVIDING CALL DETAIL RECORDS AT SUBSCRIBER PREMISES

This application is a continuation of application Ser. No. 09/092,704, filed Jun. 5, 1998 now U.S. Pat. No. 6,240,164.

Elements of this invention were disclosed in Document Disclosure No. 405705 filed Sep. 30, 1996, in connection with the Document Disclosure program.

BACKGROUND OF THE INVENTION

1. Technical Field

The apparatus and method of the present invention relate generally to the automatic recording of telephone call details. More specifically, they relate to an apparatus and method of providing an automatic printout of call data including parameters such as the date, time, and duration of a call, number dialed (outgoing calls), calling number (incoming calls) and, optional account number enabling the identification of call (i.e. business/personal). Each call comprises a "record", each record having call data or parameters associated therewith. The apparatus is envisioned to be of primary use in the home or small business but may be used anywhere access to the telephone line is available.

With the increasing popularity of home offices, there is an increasing use of the home phone for business. It is important for home workers to properly document their phone usage for accounting purposes. This is especially true concerning outgoing, long distance, business calls, where an expense deduction may be in order, and with respect to both incoming and outgoing when the individual bills for time spent on the phone, e.g. lawyers etc.

As mentioned, many of these home workers utilize their home telephone for business. Even in those cases where a separate number is used for business, this is frequently done on a single line, using what the telephone company calls "distinctive ringing." This refers to the feature where calls coming into the residence on the different numbers will ring differently, even though it is the same physical line. Thus, this feature allows the listener to distinguish incoming business calls from incoming personal calls—based on the type of the ring. Presently, up to four alternate numbers/ringing patterns can be utilized on a single phone line.

As mentioned, one significant limitation to this technique is that only one physical phone line is used. All outgoing long distance phone calls are billed to the primary number. Thus, the telephone bill provides no means of distinguishing between business and personal long distance calls. Heretofore, it was common for the worker to account for each call using pencil and paper to record the date, time, and number called with respect to the business calls, so that business calls could be reconciled later with the telephone bill. Clearly this is a time consuming annoyance. Even more important, the misidentification of a call may result in lost billing opportunities or expense deductions.

The present invention is designed to automatically monitor the telephone line and to record and printout various call parameters in order to automate this call tracking or identification function. In the preferred embodiments, these printouts may be accomplished either in "real time" as the call is terminated, and upon user command at some later time. For outgoing calls, the preferred call record would include call start and end times, the number dialed and the duration. For incoming calls, the start and end time, and duration of the call are recorded and printed. It may also identify the "line" i.e. the number/distinctive ring on which the call came in.

For both the incoming and outgoing calls, the system may keep track of an optional "account number" which can be used to identify the call with a specific project, client or the like. The account number may be entered anytime during the call, presumably after the conversation is ended, but at any rate, before hanging-up the handset. On outgoing calls, the account number could also be entered immediately after dialing the number but before the called party answers. The account number may be entered on the telephone set just like dialing a number except that a "*" or "#" would be entered first. In the preferred embodiments, the software is coded to treat the entry of a nonstandard key such as "*" or "#" as the precursor of the account number.

With respect to the incoming calls, the system may also include a caller identification feature and, the system will record and printout the caller's identification. This service from the telephone company is commonly referred to as "caller ID."

As is well understood in the art, the telephone companies have been offering a service referred to as "caller ID" in various parts of the country, since the early 1990s. This service allows subscribers to receive information on incoming calls. Such information comprises the caller's telephone number and identity.

Finally, the system may include a storage feature wherein call information may be stored for a period of time and then printed out upon demand. Such a storage printout may be formatted to accomplish a specific objective, such as printing out call data organized by account number or the like. In the design of the preferred embodiment, the microcontroller contains internal RAM capable of call record storage. Additional storage capacity may be achieved using external RAM.

A major consideration with respect to the connection of equipment to the telephone lines. Specifically, compliance with FCC regulations, specifically part 68 which requires among other things, good line balance, low insertion loss, and light line loading.

Throughout the specification, the following terms and their definitions will be used. "Parameters" includes the call data which is gathered, stored and printed for each call. The parameters gathered depend on the nature of the call i.e. incoming or outgoing. A "call record" is a set of parameters which have been gathered & stored for a call.

2. Description of the Prior Art

The concept of telephone usage monitoring is not new. Several prior art devices have disclosed apparatus for monitoring the telephone line and the recording of various parameters.

One such example is the inventor's own prior art apparatus designated the "TEQ1000." This apparatus monitored up to ten telephone lines recording such parameters as the time and duration of a call and the number dialed, in the case of outgoing calls. A similar but smaller model "TEQ 100" monitored a single line. The apparatus printed out the call parameters at the termination of the call. Additionally, the calls were stored in memory (RAM), permitting the calls to be printed out at a later time, in what was referred to as an "accounting printout" wherein the calls were grouped by an account number. The design of the system permitted a user to enter an "account code" sometime during the course of each call, thereby assigning that call an account code. Later, when the accounting printout was triggered, the system searched through RAM grouping all calls with the same account code. With respect to incoming calls, the only parameters which could be monitored were the time and duration of the call and only if the call were answered. Neither unit provided any means for acquiring and processing "caller ID" data. The user could enter an account code to track the call.

Another, more recent apparatus is disclosed by Hunsicker in U.S. Pat. No. 4,656,657. This apparatus functions in a manner similar to the TEQ100. The time and duration of the calls are monitored as well as the number dialed for outgoing calls. With respect to incoming calls, the Hunsicker apparatus detects the number of rings. The call data is then printed out or displayed. With respect to incoming calls, it appears that a record is printed regardless of whether the call was answered or not. Additionally, both the incoming and outgoing segments of the system utilize a voice detector to ascertain when the call begins.

Consequently, it is a primary objective of the present invention to provide a telephone monitoring apparatus capable of monitoring both incoming as well as outgoing calls.

Another primary objective is to provide a telephone monitoring apparatus wherein various call parameters such as number dialed, start and end times, duration, account numbers, incoming call data and the like, may be printed out.

An additional objective is to build telephone monitoring apparatus wherein the call parameters may be temporarily stored in memory for later grouping and printout according to an assigned account number.

SUMMARY OF THE INVENTION

An apparatus and method for automatically monitoring and recording incoming and outgoing telephone call parameters and forming a call record in response thereto, the calls occurring within a telephone system connected at terminal points to telephone sets by telephone lines, the telephone sets utilizing DTMF signaling tones and the telephone lines comprising either of a "off-hook" or an "on-hook" status, the "off-hook" status being indicative of a call in progress and the "on-hook" status representing a standby status wherein calls may be received, the transition from on-hook to off-hook and off-hook to on-hook representing the initiation and termination of a call respectively, the apparatus adapted for connection to the telephone line and comprising: signal conditioning means connected to the telephone line; an outgoing call decoder means having an input connected to the signal conditioning means and an output, the output call decoder means operative to output data responsive to outgoing calls, the output data comprising an output call record; line status detector means having an input connected to the signal conditioning means and an output, the line status detector means operative to output a signal indicative of whether the telephone line is in an off-hook status; incoming call decoder means having an input connected to the signal conditioning means and an output, the incoming call decoder means operative to output an incoming call data signal responsive to an incoming call, the data being used to form an incoming call record; clock means for determining the date, time of day, and duration of the incoming and outgoing calls; and a computation means connected to the incoming and outgoing call decoder means, the clock means, and the line status detector means, the computation means being operative to form incoming and outgoing call records comprising data received therefrom, the incoming call record comprising the incoming call data, the call start and end times, and the call duration, the outgoing call comprising the outgoing call data, the call start and end times, and the call duration, the computation means further comprising means for displaying the records.

A method of automatically tracking telephone usage in order to accurately account for telephone expenses, comprising the steps of: providing an call detail recording apparatus; entering the current date and time using the clock means; monitoring the telephone line for an incoming call indicated by the presence of incoming call data; receiving incoming caller identification data upon detection of the incoming call data; detecting a transition in the telephone line status from the on-hook status to the off-hook status and initiating a reading of the clock means and determining call start time in response thereto; detecting a transition in the telephone line status from the off-hook status to the on-hook status and initiating a reading of the clock means and determining call end time in response thereto; computing a call duration from the call start and end times; forming an input call record comprising the incoming call data, the call start and end times, and the call duration; monitoring the telephone line for an outgoing call indicated by detection of a transition in the telephone line status from the on-hook status to the off-hook status; detecting the transition in the telephone line status from the on-hook status to the off-hook status and initiating a reading of the clock means and determining call start time in response thereto; monitoring the DTMF decoder means for the presence of any data and receiving the DTMF data upon detection thereof; detecting a transition in the telephone line status from the off-hook status to the on-hook status and initiating a reading of the clock means and determining call end time in response thereto; computing a call duration from the call start and end times; forming an outgoing call record comprising the DTMF data, the call start and end times, and the call duration; and displaying the incoming and outgoing call records.

DESCRIPTION OF THE PREFERRED EMBODIMENT

1. Theory of Operation

The purpose of the present invention is to provide an automatic recording of telephone call parameters such as the time and duration of the call numbers dialed (outgoing), caller's identity and telephone number (incoming). Additionally, the invention provides a means for the user to input a code identifying the call as a business call and to enter an "account code". Table I below, presents one illustrative example of a preferred printout format. The parameters recorded for a call form a call record.

The call parameters are printed at the end of the call for later analysis. Additionally, the call data may be sent to memory for future retrieval and printout by account number. Depending on the desired storage capacity, this memory may comprise the microcontroller's internal RAM or may utilize external RAM.

The call data recorder of the present invention is adapted to record, store and print several different call parameters depending on the type of call. For example, for both incoming and outgoing calls, the date, time and duration of the call are recorded for outgoing calls, the number dialed and optional "account code", if entered, are also recorded. For incoming calls, the caller's identification and telephone number are recorded as well as the optional "account code". It is anticipated that the optional "account code" would be entered using the telephone keypad for example by entering a "#" and the number. It is further anticipated that the initial data, such as the setting of the clock, may also be accomplished using the telephone keypad. Alternatively, a small keypad for this purpose may be utilized.

One of the benefits of the present invention is that it provides a means for reconciling telephone and other billing records. In order to facilitate this reconciliation, a paper printout of the call data is provided. In the preferred embodiment, this may be accomplished in one of two ways. First, one of the microcontroller ports may be utilized for connection to an existing printer, such as that used with the home owner's personal computer. Alternatively, a small stand-alone printer may be provided as a part of the call data recorder itself. As described in more detail below, several manufactures including Seiko Instruments MTP series and AXIOM's "clamshell" series are well suited for this purpose.

The call data recorder of the first preferred embodiment may further comprise a means for visually displaying call data. Most basically, this information would consist of the number and call duration although any or all of the monitored data may be displayed.

In the first preferred embodiments of the present invention, this display would comprise an LCD display, capable of displaying one or more lines of text.

LCD displays are well known and widely used in the art. For example, more exotic displays could be used for displaying additional information such as text, or the like. One example is HED092 1×16 dot matrix LCD manufactured by Falcon/Trumeter of Manchester, England which permits display of 16 text characters.

2. Implementation

The present invention utilizes off-the-self components to perform all functions, thereby maximizing the cost effectiveness of the unit.

Figure 1:
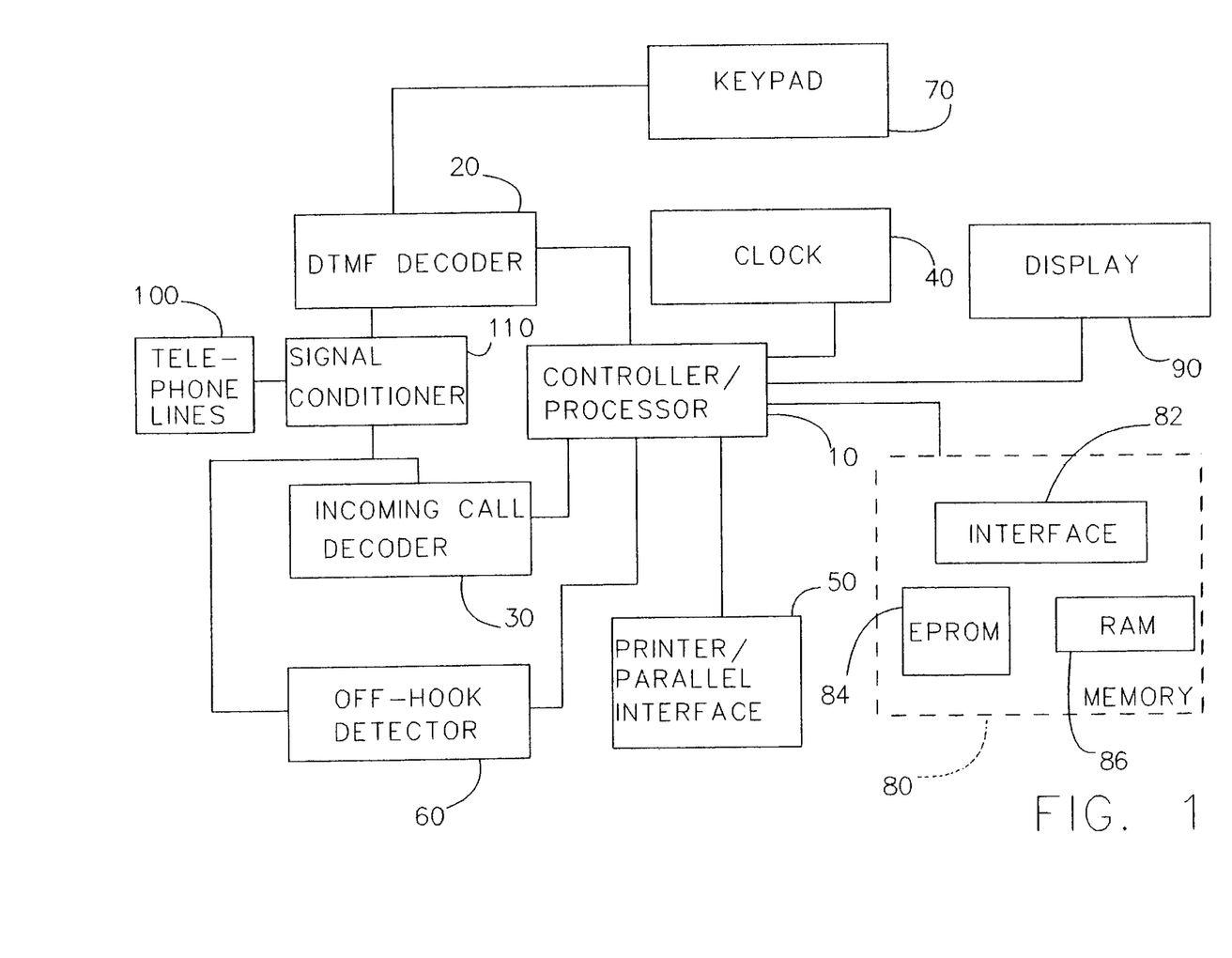
FIG. 1 is a functional block diagram of the apparatus.

FIG. 1 is a block diagram of the invention. As described in more detail below, the invention is connected to the telephone lines 100 through signal conditioning means 110. Similarly, the line status detector 60, incoming call decoder 30, DTMF decoder 20 are connected to the telephone lines 100 through signal conditioner 110. In the preferred embodiments, the signal conditioner 110 provides the required interface to the telephone lines such as balance, polarity protection, loading, and isolation. As is well understood in the art, the telephone line exists in one of two states, on-hook or off-hook. The on-hook state is the nominal state during telephone calls may be received. Off-hook is the state when a telephone conversation is taking place.

Line status detector 60 which determines when the call begins and ends. The line status detector 60 would likely comprise a voltage level detector. As is well known in the art, the nominal, open-loop telephone line voltage with the hand-set "on-hook" is approximately 48 volts whereas the line voltage with hand-set off hook is approximately 5 volts, although these voltages vary from location to location. Thus, the line (hook) status can be determined by the line voltage with respect to some intermediate value. The line status detector 60 would comprise a means for adjusting this intermediate threshold value to accommodate variations in these voltages.

The invention also comprises a DTMF decoder 20 connected to the telephone line through signal conditioner 110. The DTMF decoder 20 is utilized to decode the Touch-Tones® generated by the telephone set and transmitted during dialing. This allows the system to record the outgoing telephone number. As mentioned, this may also be utilized for data entry such as account codes and setting the clock 40. In a preferred embodiment, a Harris Semiconductor CD2204, Teltone M-957, Silicone Systems 202-p or the like, which are designed to decode the Dual-Tone Multi-frequency (DTMF)® tones used by the telephone system.

The preferred embodiment also includes an incoming call decoder 30 connected to the telephone lines 100, again through signal conditioner 110. The incoming call decoder 30 would, if the owner subscribed to the so-called "caller ID" feature, provide a recording of the caller's ID, phone number, etc. As is well understood, the telephone company provides a subscription service which transmits the calling party's identification. This information typically includes its name and telephone number. This data is sent to the subscriber from the telephone central office, at the time the initial ringing of the called party occurs. The data is sent using a common modulation technique known as Frequency Shift Keying (FSK). This data may be decoded and used by the present invention by reading and decoding this FSK data by the Incoming Call Decoder 30. There are many ways to accomplish this task. One preferred method utilizes a commonly available integrated circuit, XR2211 from EXAR is specifically designed for this purpose and is described in more detail below. Thus, the present invention comprises a means for making a complete record of incoming calls.

Each of these three telephone line connections would be monitored by the controller for its status and/or data.

A clock 40 would also be connected to the controller in order to determine the time and date parameters associated with each call record, as well as the duration thereof. Many compatible clocks are available, one example of which is the 5832 by OKI Semiconductor. This clock is microprocessor compatible and is easily interfaced to controller 10.

A printer/parallel interface 50 would likely be used to create a permanent record of the call data. Many suitable printers are available. Two possible configurations are taught. First, a dedicated printer. In that embodiment, in order to keep costs and size to a minimum, it is anticipated that small "micro-printer" be used. Examples of such printers are the Seiko Instruments MTP series and AXIOM's "clamshell" series. For example, the Seiko MTP-201 allows for a print width of 24 characters, more than sufficient to show dialed digits, time, duration, and an account #. This printer is very compact (48×31×138 mm) and is available at a reasonable price. In a second configuration, an existing printer, for example for the home PC, is utilized. In either configuration, the parallel interface 50 provides the communication means for communicating the call record data to the printer. As shown in FIGS. 2A–D below, a parallel interface is employed although a serial interface is also possible. In the preferred embodiments utilizing the 8051, the "interface" 50 is nothing more than a connection to one of the microcontroller's data ports.

Additionally, it is contemplated that an interface might be desired in order to permit the downloading of call data from the recording system into a personal computer for analysis. This interface could also be either serial or parallel. Again, interface 50 could provide this for the parallel embodiment.

Depending on the number of functions to be implemented, It may be desirable to include a keypad and associated interfacing 70, for data or command entry such as setting the date, time, etc. Alternatively, it may be possible, to accomplish entry of such data and commands using the telephone itself, minimizing component count and cost as much as possible. For example the time and date, as well as other commands, may be entered using the telephone set, for example, by first entering a "*" followed by the data to be entered.

The central control element is the microprocessor/controller 10. Many acceptable controllers exist such as the INTEL MCS 51/MCS 48 series, ZILOG Z8/Z80 series, MOTOROLA's 6800, etc. In the preferred embodiments, the INTEL 5061 is used and is illustrated in FIGS. 2A–D, 3, and 5. The preference for the MCS51 (e.g. 8051) derives from the fact that it comprises an internal serial port, greatly simplifying the acquisition of the FSK (caller ID) data. Additionally, the MCS 51 comprises internal RAM allowing for storage of some call records. External data memory may be used if a larger number of call records must be stored.

The call data recorder of the first preferred embodiment may further comprise a visual display 90. Most basically, this information would consist of the number and call duration although any or all of the monitored data may be displayed. Such a display may comprise an LCD or dot matrix display, capable of displaying one or more lines of text.

Figure 4:
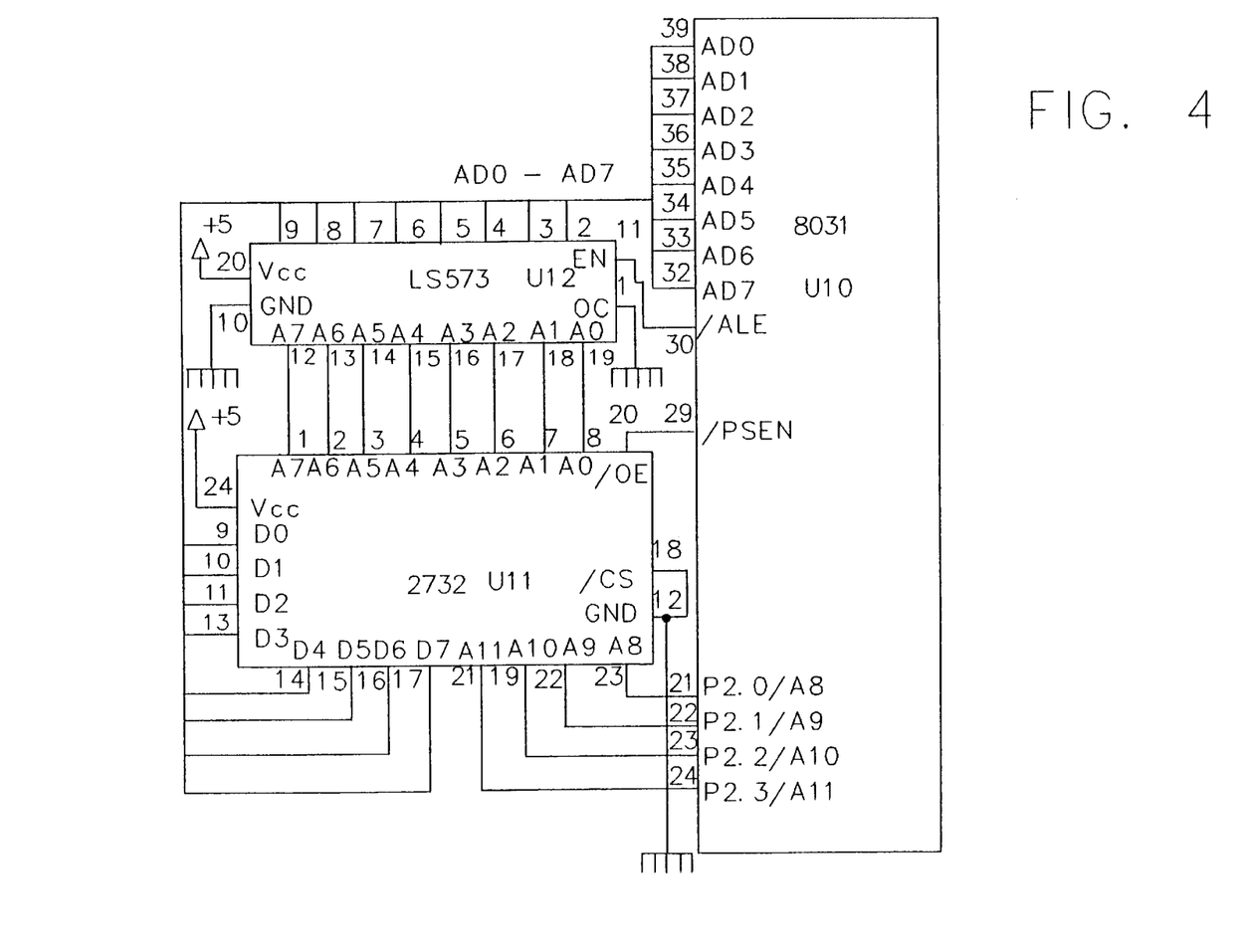
FIG. 4 is a schematic diagram illustrating the use of extended program memory.

An external program memory means 80 may be used, if required, to store and control program memory for the microcontroller although this is not necessary in the preferred embodiment. Memory means 80 has been indicated with a doted line to identify its optional nature. If an external memory 80 is utilized, it would, likely include interfacing 82, EPROM 84, and RAM 86. As is well understood in the art, interfacing 82 would serve to de-multiplex the address and data as required on the MCS 51 controllers for external control of program memory. The EPROM 84 is used for storage of the program code. This implementation is illustrated in FIG. 4.

However, depending on the microcontroller configuration chosen, such an EPROM and RAM might not be necessary. For example, as mentioned, in the preferred embodiments, an INTEL 8051 or 8048/49/50 are used as the computation means 10. As those well skilled in the art will recognize, these microcontrollers comprise up to 4K of internal ROM. If this is sufficient capacity for the software code, as in the present invention, the memory means 84 may eliminated, and the program code stored, 'on-chip'. Elimination of the code control means is preferable since this effects a saving in both parts count and in power consumption.

Preferred Hardware

As seen in FIGS. 2A–D, 3, and 5, the microcontroller U1 is the center of the system and controls all functions. As mentioned, both the 8051 (MCS 51) and 8048 (MCS48) controllers comprise a plurality of data ports which may be used for data entry and transmission as well as internal RAM and ROM.

Alternatively, FIG. 4 illustrates the configuration with external program memory. Use of the ROMless 8031 U10 as illustrated, necessitates an external EPROM U11 for program storage, and latch U12 for de-multiplexing the address and data signals on Port 2. One skilled in the art will recognize that many other suitable microprocessors and microcontrollers are available. Some, such as the Z80, do not have "on-chip" ROM or RAM & require further external circuitry well within the capability of one skilled in the art.

The INTEL 8051 controller of FIGS. 2A–D, 3, and 5 contains 128 bytes of internal RAM and 4K of internal ROM. The 8051 controller is preferred in commercial embodiments as component count, cost and power consumption are minimized as well as freeing up additional I/O ports which would otherwise be needed to interface memory. Furthermore, the MCS 51 is preferred because of its internal serial interface greatly simplifying the processing of incoming call data decoding using FSK decoder U3.

Figure 2A:
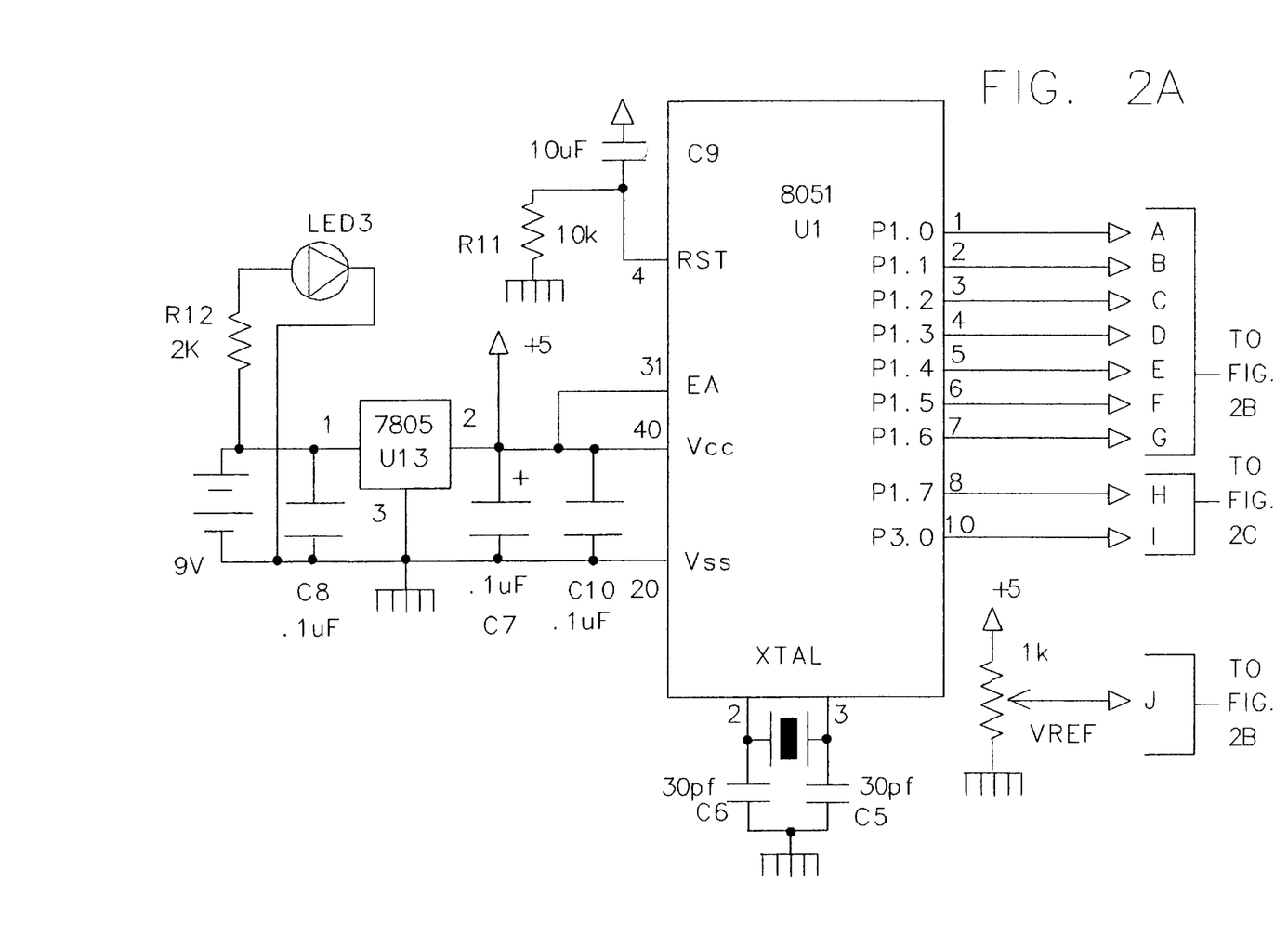
FIGS. 2A–D are schematic diagrams of a preferred embodiment of the present invention.
Figure 2B:
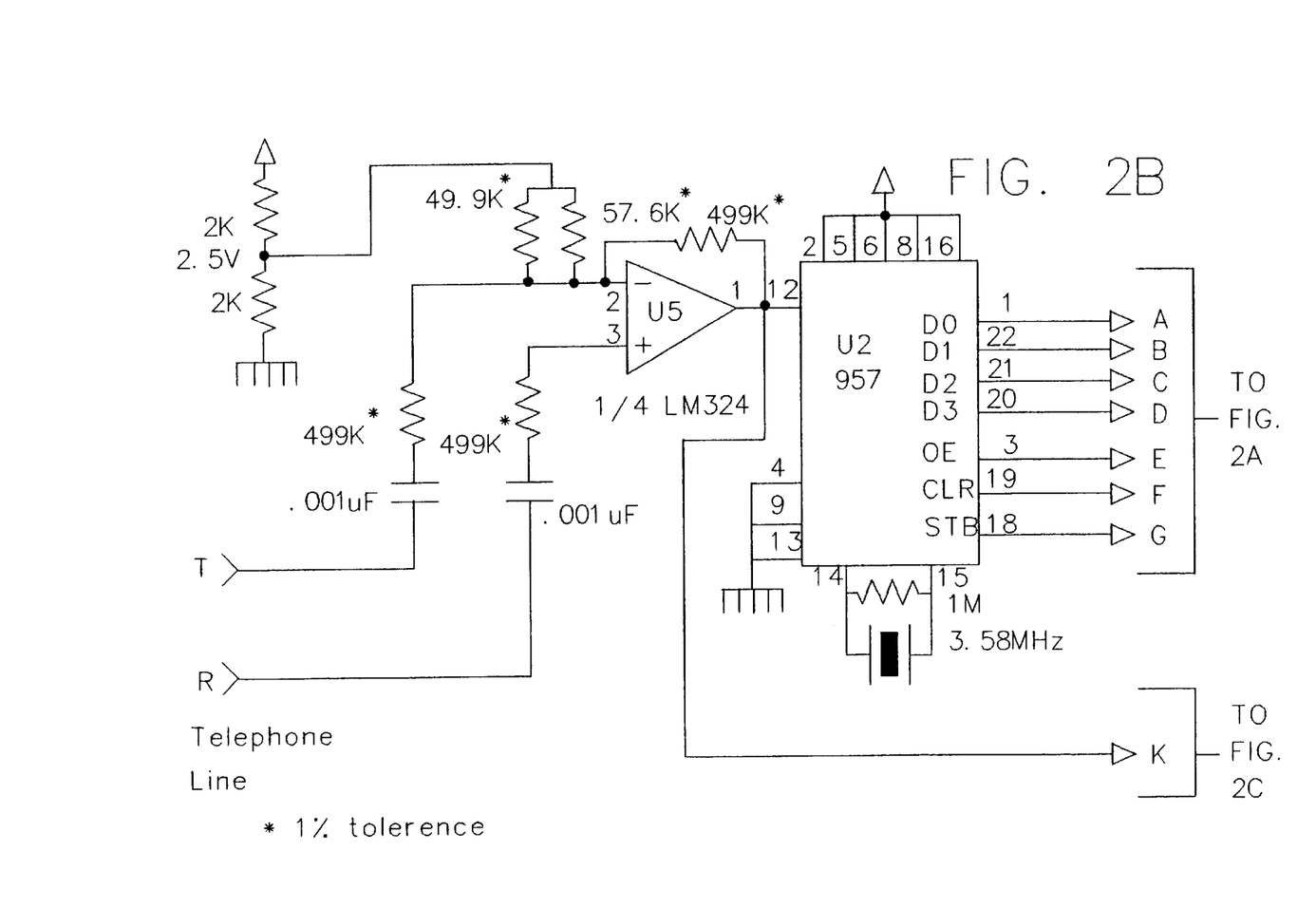
Figure 2C:
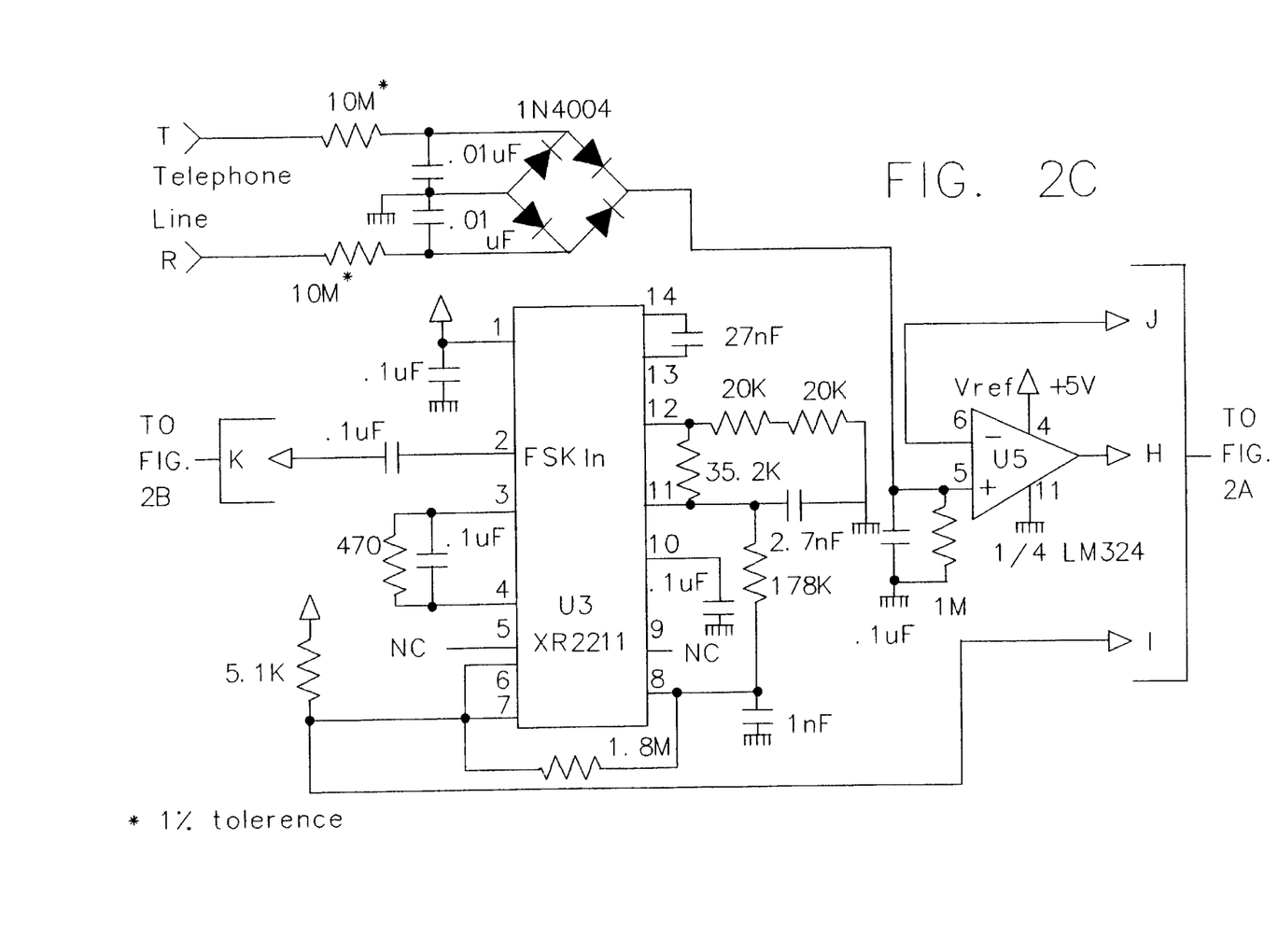
Figure 2D:
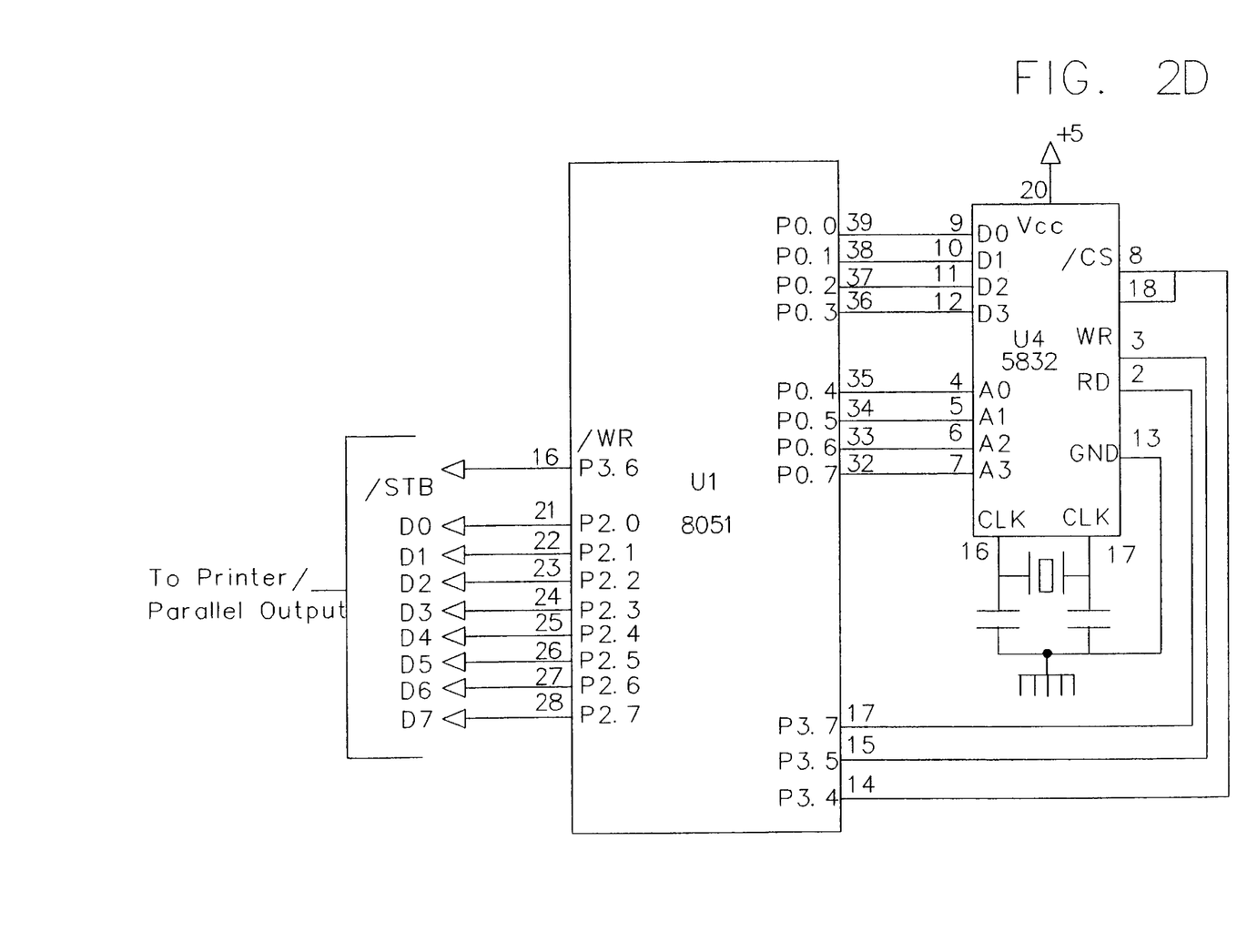

Focusing on FIG. 2D, U4 is a clock chip which is connected to one of the data ports to provide date and time information. As mentioned, one satisfactory IC is the MSM5832. This IC outputs date and time information in a BCD format using four data lines. Four address lines are used to specify what data is to be read. For example, address (0h) identifies seconds/1 whereas address (Ch) identifies years/10. As is well understood by those in the art, the 8051 microcontroller port lines are individually addressable. Thus, a single microcontroller data port may be used to both set the read address and read the data.

Figure 3:
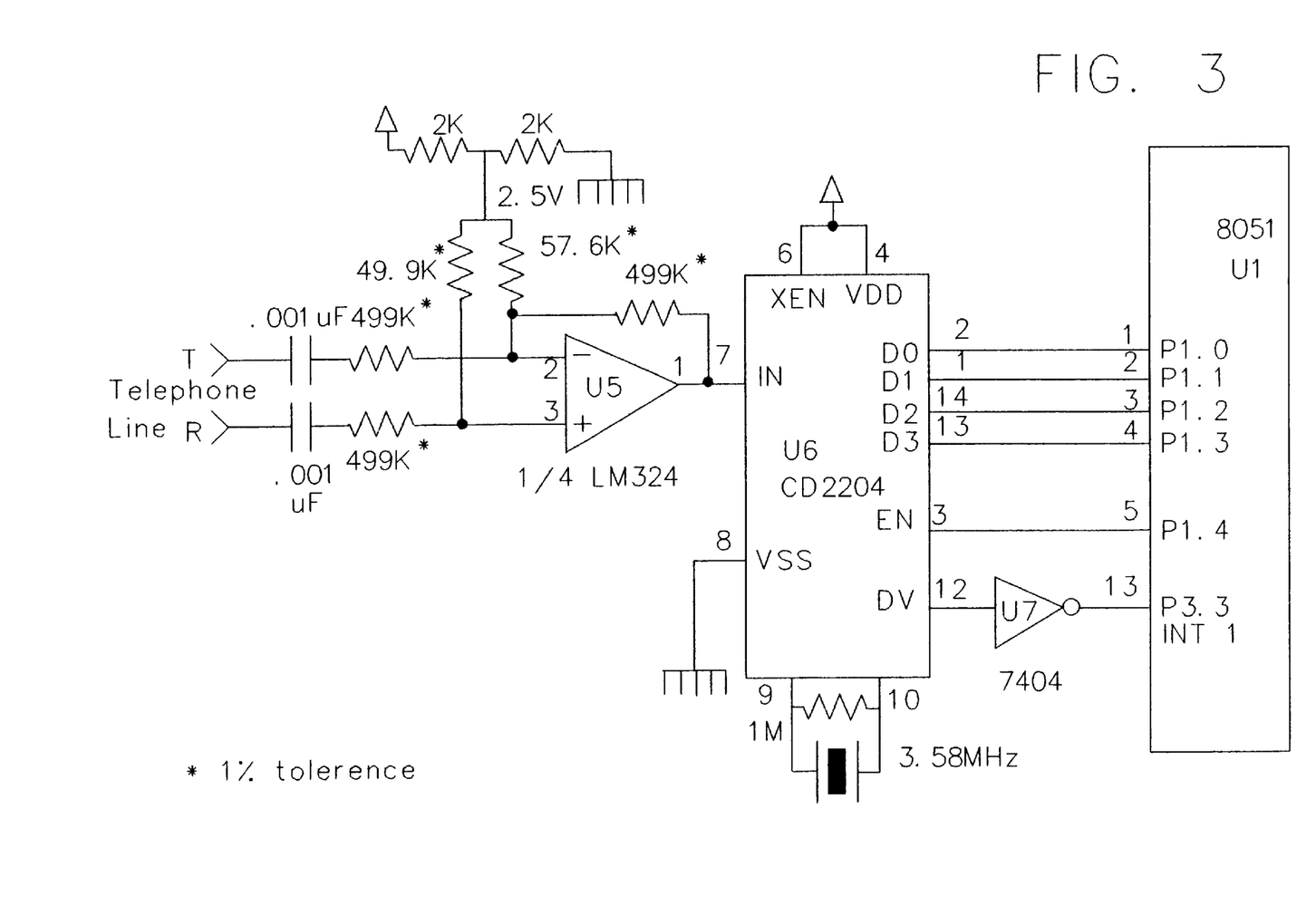
FIG. 3 is a schematic diagram of an alternative design for the preferred embodiment of the present invention utilizing an alternative means for decoding dialed numbers.

The Touch-Tone decoding circuitry is illustrated in FIGS. 2B and 3. In the preferred embodiment, the decoding is accomplished by a Touch Tone decoder such as those manufactured by Harris Semiconductor, Teltone, NEC Electronics, Silicon system and others. These ICs output a BCD representation of the number dialed using four data lines. The decoder is interfaced to the telephone line through the signal conditioner which uses a differential input interface, providing isolation of the telephone line sufficient to meet FCC part 68.

FIG. 2B illustrates the use of the TELETONE 957 U2 for Touch Tone decoding whereas FIG. 3 illustrates the use of the Harris Semiconductor CD2204 U6 for the decoding of the TOUCH-TONES.

As seen in the figures, the interfacing of the decoder ICs is quite similar in that the four data outputs are connected to four port lines of the microcontroller U1. The other port lines can then be used for control, etc. One difference in the interfacing of the two TOUCH-TONE decoders U2 & U6 is in how the presence of data (i.e. a decoded digit) is identified. FIG. 2B, utilizing U2, illustrates the polling method whereas FIG. 3, utilizing U6, illustrates the interrupt method. This difference is necessitated by the functioning of the two ICs. In the case of the TELTONE 957 U2, the availability of data is signaled by the STB line. The data remains available until cleared by strobing the CLR line, or the elapsing of a 40 ms pause occurs. Given the speed with which the microcontroller U1 operates, it is quite possible for the microcontroller to read the data several times before the 40 ms time expires. Therefore, it is necessary to clear the data using the CLR strobe after it has been read once. In the case of the CD2204 U6, there is no CLR signal. Thus, it is best to use an edge triggered interrupt to trigger the reading of the data. Thus, FIG. 3 illustrates the use of an interrupt to notify the microcontroller of the presence of valid data from the decoder. This technique could also be used with the 957 U2. Since the interrupt input (P3.3) on the 8051 is active-low, an inverter U7 (7404) would be required for proper interfacing. Another possibility is to implement a 40 ms delay in the microcontroller U1 using the its internal timer.

The line (hook) status and caller ID decoding is shown in FIG. 2C. The determination of hook status is made by comparing the line voltage to a reference voltage. As mentioned above, the on-hook, open-loop voltage is approximately 40 volts, whereas the off-hook, open-loop voltage is approximately volts although this may vary somewhat by location. After being put through the signal conditioner, these voltages may be dropped considerably, nevertheless, there remains a voltage spread. Thus, if a voltage comparator is used to compare the line voltage to a reference of some intermediate voltage, the line (hook) status can be determined. Some additional interface circuitry may be utilized in order to achieve TTL compatibility for the ICs. In the preferred embodiment, U5 is ¼ of an LM324 voltage comparator which is used as the detector. This comparator outputs a TTL "high" when the non-inverting input (+ input) is greater than the reference voltage (− input), and a TTL "low" when the input is below the reference voltage. The intermediate voltage may be achieved by a voltage divider. A potentiometer provides an easily adjustable means of obtaining a suitable intermediate value.

The portion of the signal conditioning circuit illustrated in FIG. 2C comprises a pair of 10M resistors, a pair of decoupling capacitors, and a bridge rectifier. The 10M resistors are utilized to provide sufficient isolation of the circuit from the telephone lines. Additionally, use of 1% tolerance resistors assures proper balance of the lines. Finally, use of the bridge rectifier assures that the polarity of the connection to the telephone line is not a concern.

As mentioned above, in a preferred embodiment, it is desirable in some embodiments to provide the capability for reading the "caller ID" information transmitted over the telephone line to subscribers. This feature is also illustrated in FIG. 2C and is accomplished using U3, an EXAR2211 FSK decoder IC, by principles well understood to those in the art and as is well explained in EXAR's product literature. As mentioned above, the MCS 51 series controllers (e.g. 8051) comprise an internal serial port (P3.0/P3.1) making this family especially attractive for the preferred embodiment utilizing a "caller ID" decoder.

Finally, the system is adapted to interface with a printer in order to create "hard copy" records of the call data. Interfacing with a printer is illustrated in FIG. 2D. As illustrated, it is contemplated that this interface would most likely be parallel, although a serial interface is also possible. It is envisioned that one of the controller ports (e.g. port 2) would be used to provide call data for printing in the parallel fashion. The software may also make the call data available, either in real time, or in accumulated form, to a personal computer for analysis. This too may be provided using the parallel interface.

Figure 5:
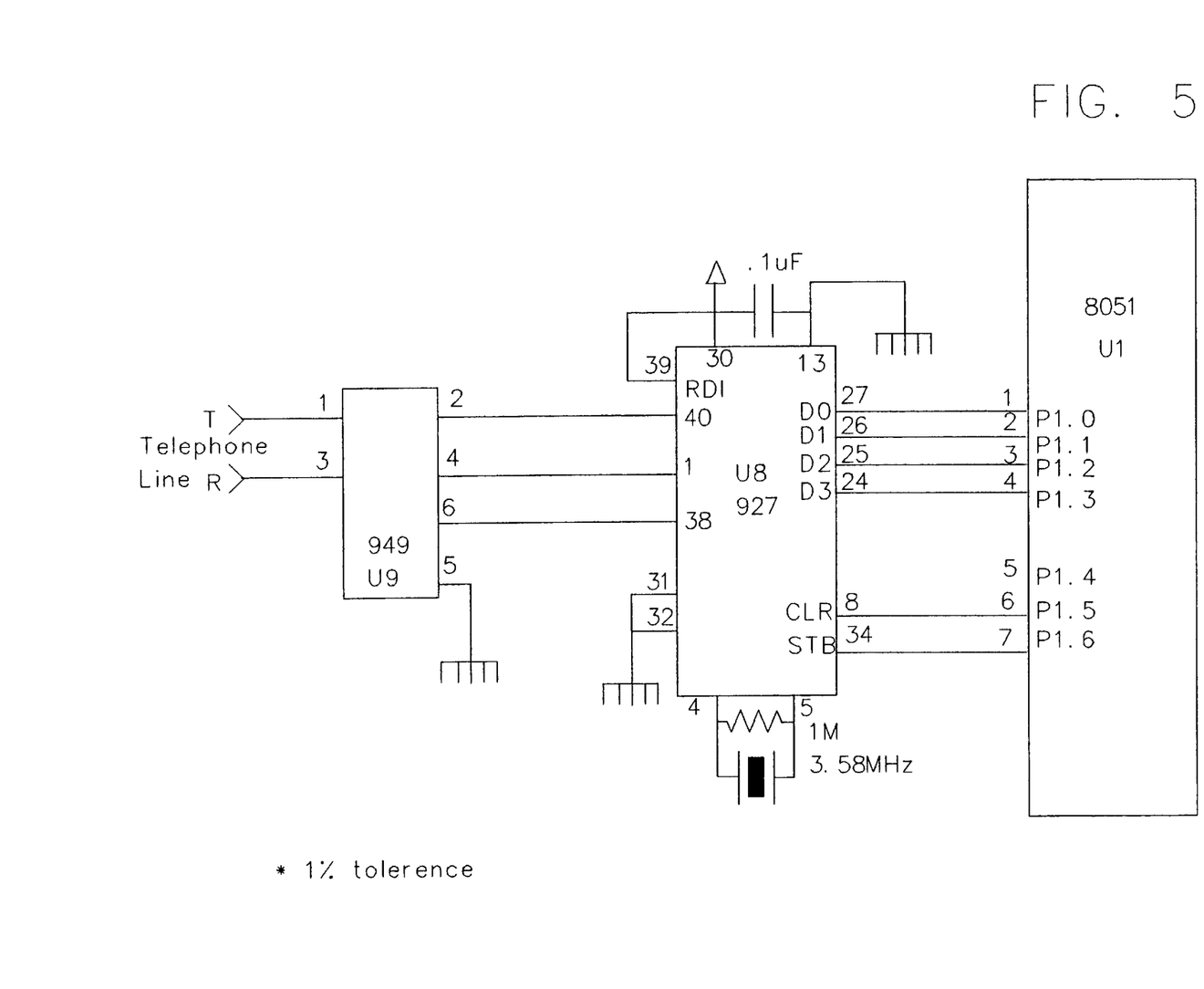
FIG. 5 is a schematic diagram of an alternative embodiment of the present invention utilizing an alternative means for connecting the apparatus to the telephone lines.

FIG. 5 shows an alternative signal conditioning means for connecting the tone decoder to the telephone line. U9 is an M-949 Balanced-line Sense Relay manufactured by TELE-TONE and adapted for serial connection to the telephone line. Not only does this provide a means for connection of the tone decode, but also provides a means for detecting the line status.

It will be understood that many of the system functions will be controlled in embedded software. As mentioned, the software may also be used to accomplish auxiliary functions such as the accumulation and printing of call data by account number, etc.

Software

As mentioned, software will control implementation of most functions. The following discussion is directed to implementation using the preferred INTEL MCS 51 family. Those skilled in the art will readily recognize implementations for alternative controllers or processors.

Figure 6A:
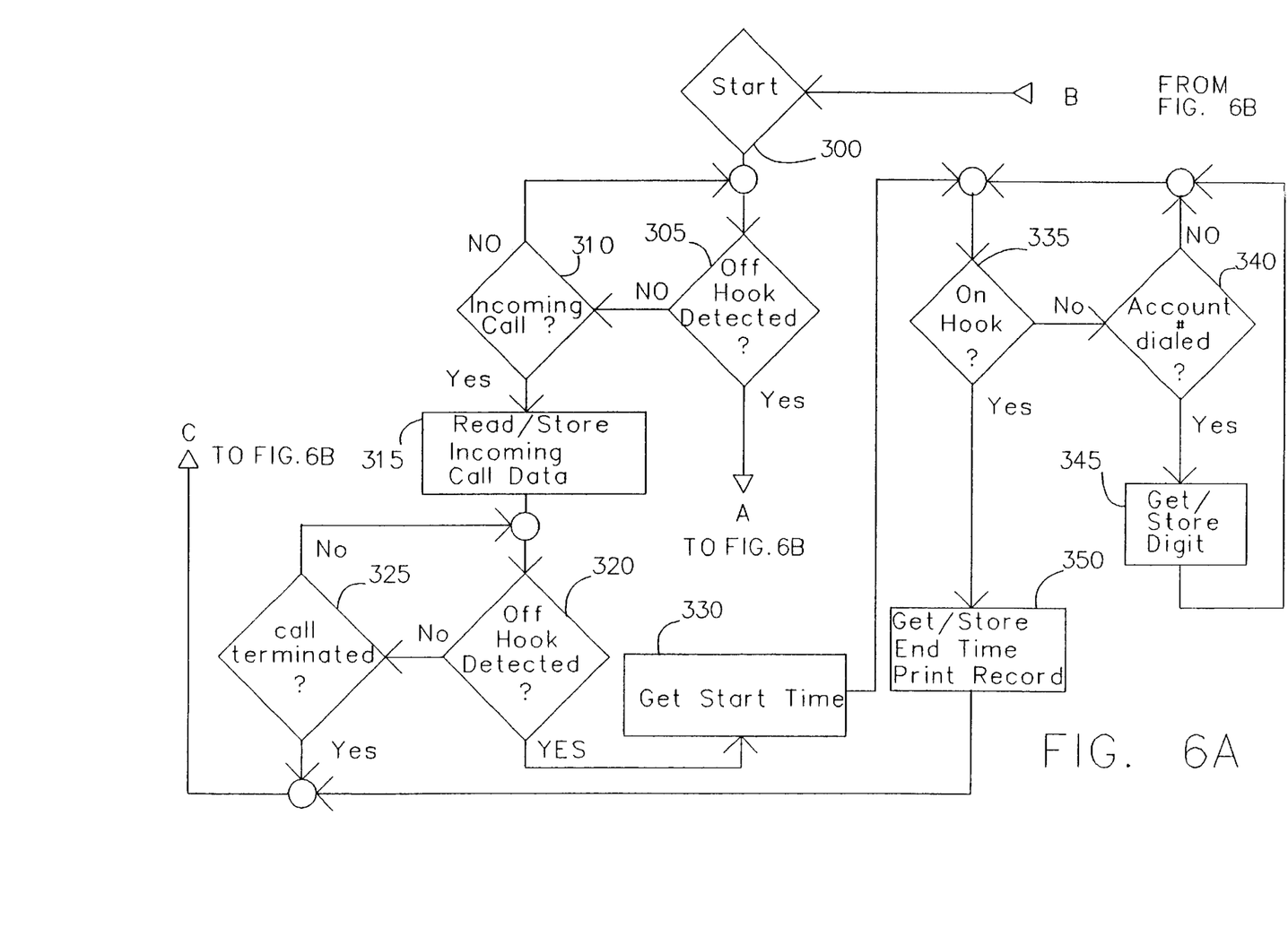
FIGS. 6A & 6B are flow charts showing the major functions performed in software in the preferred embodiment.
Figure 6B:
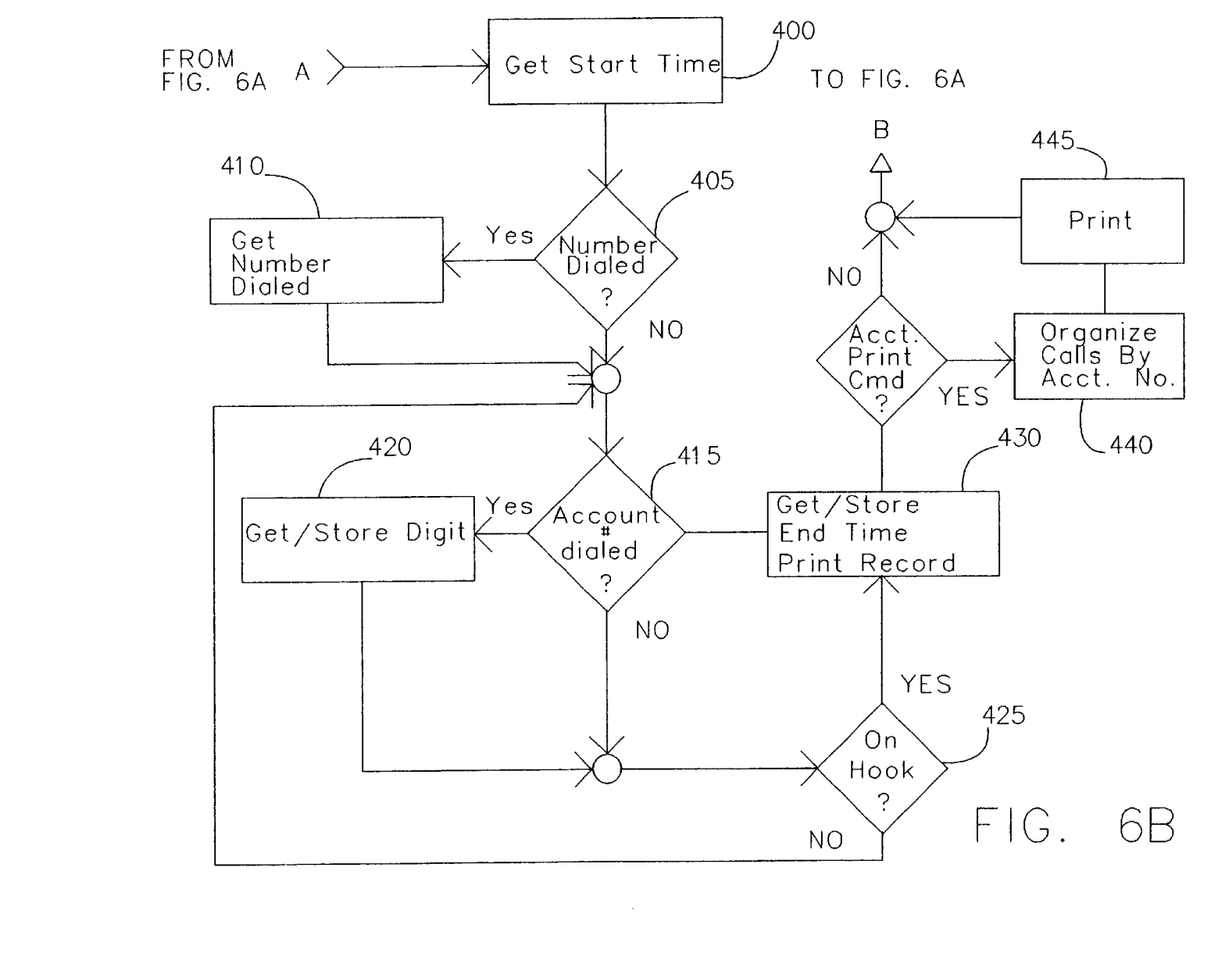

FIGS. 6A & 6B are flow charts illustrating the major functions performed in software. The figures are separated approximately by function, i.e. FIG. 6A is directed primarily towards incoming calls and FIG. 6B is directed primarily towards outgoing calls.

The first function 305 performed is to monitor the status of the telephone hook, i.e. whether the telephone set is on or off hook. If the set is on-hook (ie. no call in progress) the software determines whether there is an incoming call 310 by polling the internal serial data receive flag to determine if any data has been received. This serial data would be from the FSK caller ID decoder U3. As will be well understood by those in the art, as an alternative to the polling method, the interrupt method of data availability notification may be used. If data is not available, the software returns to monitor the hook status 305. Thus, the software will loop between 305 and 310 until either incoming data is received or the line is taken off-hook. The latter case is indicative of an outgoing call which is described below in connection with FIG. 6B.

If the internal receive interrupt (RI) flag in the microcontroller's U1 SCON Special Function Register is set, indicating serial data is available, the data is read 315 from the serial data buffer (SBUF register) and the RI flag is cleared. As mentioned, this incoming serial data comprises the caller identification data. This reading procedure continues until all incoming caller ID data is read. This caller identification data is stored temporarily while the additional call record data is accumulated. The additional data comprising the call record includes the date, time and duration of the call (if answered). After incoming caller ID data has been read, the system again looks at the hook status 320 to see if the call is answered. The system then monitors for an off-hook condition to occur (i.e. the call is answered). When the hook status transition from on to off-hook is detected 320, the system notes the call has been answered and reads the system clock to determine the time of the call 330. The system then begins a wait for the hook status of return to on-hook 335. While the telephone is off hook, the system monitors for any numbers dialed, specifically an "#" followed by a series of numbers, signifying the use of an account number 340. Any number entered are decoded and stored 345 and used for account identification and later printout of calls grouped by account number. As described above, numbers representing the account code are "dialed" on the telephone and decoded by U2 or U6.

When the subsequent transition from off to on-hook status occurs 335, the end time is read and the call duration computed 350. A printout is then made of the call record 335 and the routine returns to the top 300.

As mentioned, the system monitors for an off-hook condition to occur 305. If such a condition occurs without preceding incoming serial data, it may be deduced that the call is outgoing (FIG. 6B). Once the off-hook status occurs 305, the system reads the clock 400 to determine the start time and date. The system then monitors the tone decoder 405 for a determination of numbers dialed. This data is decoded and temporarily stored 410 until the call ends. The system then loops looking for either an account number to be entered 415 or for the telephone to be hung-up 425. If an account number is entered, it is decoded and stored 420. When the system detects the transition from off-hook to on-hook 425, the system reads the clock 430 to determine the end time and printouts the call record.

In embodiments including call storage capacity, after completion of either incoming or outgoing calls, the system checks for operator request for an accounting printout 435. If such a request is made, the stored call data is organized by account number 440 and printed 445.

Finally, the systems returns to monitoring the line (hook) status 305 and serial data input 310.

It will be clear to those in the art that modifications to the software logic may be made without detracting from the essential working of the system. As one small example, instead of waiting for an incoming call to be answered before reading the clock, the clock could be read as soon as call data was received. Another example in the handling of unanswered incoming calls from which call records may or may not be formed.

As mentioned, at the conclusion of a call, the system prints out a call record. The composition of the call records depends on the nature of the call e.g. incoming or outgoing. The following are examples of incoming and outgoing call records.

TABLE I

| Number/party | Account | Time | Elapsed | Type | Date |
|---|---|---|---|---|---|
| Outgoing: | | | | | |
| 13025551212 | #1234 | 08:00A | 0:25:12 | Out | 1/25/97 |
| 5551212 | | 03:23P | 0:01:23 | Out | 1/25/97 |
| Incoming: | | | | | |
| 5551212 Joe Smith | #1234 | 10:23A | 1:02:23 | In | 1/25/97 |
| 13025551212 OUT OF AREA | | 11:36A | 0:01:15 | In | 1/25/97 |

It is apparent that numerous other modifications and variations of the present invention are possible in view of the above teachings.

Therefore, it is to be understood that the above description is in no way intended to limit the scope of protection of the claims and it is representative of only one of several possible embodiments of the present invention.

There has thus been shown and described an invention which accomplishes at least all the stated objectives.

I claim:

1. An apparatus for automatically monitoring and recording incoming and outgoing telephone call parameters and forming a call record in response thereto, the calls occurring within a telephone system connected at terminal points to telephone sets by telephone lines, the telephone sets utilizing DTMF signaling tones and said telephone lines comprising either of a "off-hook" or an "on-hook" status, said "off-hook" status being indicative of a call in progress and said "on-hook" status representing a standby status wherein calls may be received, the transition from on-hook to off- hook and off-hook to on-hook representing the initiation and termination of a call respectively, the apparatus adapted for connection to the telephone line and comprising:

signal conditioning means connected to said telephone line;

an outgoing call decoder means having an input connected to said signal conditioning means and an output, said output call decoder means operative to output data responsive to outgoing calls, said output data comprising an output call record;

line status detector means having an input connected to said signal conditioning means and an output, said line status detector means operative to output a signal indicative of whether said telephone line is in an off-hook status;

incoming call decoder means having an input connected to said signal conditioning means and an output, said incoming call decoder means operative to output an incoming call data signal responsive to an incoming call, said data being used to form an incoming call record;

clock means for determining the date, time of day, and duration of said incoming and outgoing calls; and a computation means connected to said incoming and outgoing call decoder means, said clock means, and said line status detector means, said computation means being operative to form incoming and outgoing call records comprising data received therefrom, said incoming call record comprising said incoming call data, said call start and end times, said call duration, and account number, said outgoing call record comprising said outgoing call data, said call start and end times, said call duration, and account number said computation means further comprising means for displaying said records.

2. An apparatus for automatically monitoring and recording incoming and outgoing telephone call parameters and forming a call record comprised thereof, the calls occurring within a telephone system connected at terminal points to telephone sets by telephone lines, the telephone sets utilizing DTMF signaling tones, the telephone line status comprising either of an "off-hook" or an "on- hook" status, said "off-hook" status being indicative of a call in progress and said "on-hook" status representing a standby condition wherein calls may be received, the transition from on-hook to off-hook and off-hook to on-hook representing the initiation and termination of a call respectively, the apparatus adapted for connection to the telephone line and comprising:

a computation means;

signal conditioning means connected to said telephone line said signal conditioning means being adapted to condition a balanced signal to a "single-sided" signal referenced to ground and comprises an operational amplifier and a resistor and capacitor network, said resistor and capacitor network connected to each of said telephone lines and to the input of said operational amplifier, the single-sided output of which is in turn connected to said DTMF decoder means;

a DTMF decoder means having an input connected to said signal conditioning means and an output connected to said computation means, said decoder means operative to output data responsive to input DTMF signaling tones;

line status detector means having an input connected to said signal conditioning means and an output connected to said computation means, said line status detector means operative to output a signal indicative of said telephone line status;

incoming call decoder means having an input connected to said signal conditioning means and an output connected to said computation means, said incoming call decoder means operative to output an incoming call data signal responsive to an incoming call;

clock means connected to said computation means for determining the date and time of day of said call; and means for outputting a call record comprising said call date and time, account number and data selected from said DTMF decoder means and said incoming call decoder means.

3. The call detail recording apparatus of claim 2 wherein said means for outputting a call record comprises a parallel interface.

4. The call detail recording apparatus of claim 2 wherein said means for outputting a call record comprises a liquid crystal display.

5. The call detail recording apparatus of claim 2 wherein said DTMF decoder means comprises an integrated circuit wherein a four-bit, BCD word is generated in response to said DTMF signal.

6. The call detail recording apparatus of claim 2 wherein said signal conditioning means is adapted to condition a balanced signal to a "single-sided" signal referenced to ground and comprises an operational amplifier and a resistor and capacitor network, said resistor and capacitor network connected to each of said telephone lines and to the input of said operational amplifier, the single-sided output of which is in turn connected to said DTMF decoder means.

7. The call detail recording apparatus of claim 2 wherein said call record comprises one of an incoming call record and an outgoing call record and wherein said incoming call data comprises caller identification data transmitted by the telephone service provider and wherein said incoming call decoder means comprises a Frequency Shift Keying (FSK) decoder operative to serially output data words responsive to said incoming caller identification data, said incoming call record comprising said caller identification data and said call date and time and wherein said outgoing call record comprises said DTMF data and said call date and time.

8. The call detail recording apparatus of claim 2 wherein said telephone line comprises "Tip" and "Ring" connections and wherein said signal conditioning means comprises first and second resistors connected to said "Tip" and "Ring" connections respectively, said resistors being connected in turn to a bridge rectifier, said bridge rectifier providing a means for assuring a proper polarity connection to said telephone lines and the output of which is a voltage indicative of said line status.

9. The call detail recording apparatus of claim 2 wherein said off-hook line status is characterized by a voltage lower than said on-hook voltage and wherein said line status detector means comprises a reference voltage therebetween, a voltage comparator connected to said signal conditioning means, said voltage comparator means operative to compare said line status voltage to said reference voltage and produce an output indicative thereof.

10. The call detail recording apparatus of claim 6 further comprising memory for storage of said call records.

* * * * *